(12) United States Patent
Kita

(10) Patent No.: US 8,120,238 B2
(45) Date of Patent: Feb. 21, 2012

(54) DEEP ULTRAVIOLET SEMICONDUCTOR OPTICAL DEVICE

(75) Inventor: Takashi Kita, Osaka (JP)

(73) Assignees: National University Corporation KOBE University, Hyogo (JP); Yumex, Inc., Hyogo (JP)

( * ) Notice: Subject to any disclaimer, the term of this patent is extended or adjusted under 35 U.S.C. 154(b) by 18 days.

(21) Appl. No.: 12/675,989

(22) PCT Filed: Sep. 3, 2008

(86) PCT No.: PCT/JP2008/065887
§ 371 (c)(1),
(2), (4) Date: Aug. 2, 2010

(87) PCT Pub. No.: WO2009/031584
PCT Pub. Date: Mar. 12, 2009

(65) Prior Publication Data
US 2010/0289435 A1 Nov. 18, 2010

(30) Foreign Application Priority Data
Sep. 3, 2007 (JP) .................................. 2007-228388

(51) Int. Cl.
H01J 63/04 (2006.01)

(52) U.S. Cl. ......... 313/495; 313/309; 313/336; 313/351

(58) Field of Classification Search .................. None
See application file for complete search history.

(56) References Cited

U.S. PATENT DOCUMENTS
2005/0073261 A1* 4/2005 Takeuchi et al. ........... 315/169.1

FOREIGN PATENT DOCUMENTS
JP 2005-54182 A 3/2005
JP 2006-79873 A 3/2006
JP 2006-199876 A 8/2006

OTHER PUBLICATIONS
English Translation of International Preliminary Report on Patentabililty Chapter II, PCT/JP2008/065887, May 5, 2010, pp. 3.

* cited by examiner

Primary Examiner — Ashok Patel
(74) Attorney, Agent, or Firm — Ogilvie Law Firm

(57) ABSTRACT

A large-area and high-luminance deep ultraviolet light source device is provided under circumstances where the scales of existing mercury lamps used as ultraviolet light sources cannot be reduced and light-emitting diodes of 365 nm or less do not reach the practical level. The deep ultraviolet light source device comprises at least an anode substrate having an ultraviolet phosphor thin film doped with rare-earth metal ions such as gadolinium (Gd) ions and containing with aluminum nitride as the host material, a cathode substrate having a field electron emission material thin film, a spacer for holding the anode substrate and the cathode substrate opposite to each other and maintaining the space between the substrates in a vacuum atmosphere, and a voltage circuit for applying an electric field to the space between the anode substrate and the cathode substrate. Light is emitted by injecting electrons from the field electron emission material thin film into the ultraviolet phosphor thin film by applying the electric field to the space between the substrates and maintaining the space between the anode substrate and the cathode substrate as a vacuum channel region.

5 Claims, 6 Drawing Sheets

DEEP ULTRAVIOLET SEMICONDUCTOR OPTICAL DEVICE

RELATED APPLICATIONS

This application claims priority to PCT/JP2008/065887 filed 3 Sep. 2008, and to JP 2007-228388 filed 3 Sep. 2007, which are incorporated herein.

TECHNICAL FIELD

The present invention relates to a deep ultraviolet semiconductor light device, and specifically to a deep ultraviolet field emission device.

BACKGROUND ART

Ultraviolet light sources (UV-A, B, C) are not only widely utilized as light sources for exposure, but also expected to be used for environmental/medical fields utilizing the strong antiseptic actions or photochemical reactions, and further to be extensively used for decomposition of environmental pollutants, water quality management, and the like.

At the present time, mercury lamps (with a luminescence ultraviolet wavelength of 254 nm) are mainly used as ultraviolet light sources. In the case of a mercury lamp, its electron source is of a filament type, the light source by electronic excitation naturally becomes a large vacuum-tube device such as a fluorescent lamp. Therefore, the current ultraviolet light sources have problems such as a risk of operating loss due to short lifetime/vacuum tube rupture or difficulty in downsizing of device chips.

Further, a countermeasure for the RoHS directive is also important. This is officially referred to as the "Directive on the Restriction of the Use of Certain Hazardous Substances in Electrical and Electronic Equipment," that has taken effect from July 2006 in all European Union member states. With respect to electrical and electronic equipment, the usage rates of six hazardous substances which are lead, mercury, cadmium, hexavalent chromium, polybrominated biphenyls (PBB), and polybrominated diphenyl ether (PBDE) are restricted. Here, mercury is restricted to be 1,000 ppm or less, and therefore, the development of mercury-free light sources in place of mercury lamps is urgently needed.

Against this backdrop, nitride semiconductor light-emitting diodes are recently actively researched as mercury-free light sources in place of mercury lamps.

However, as matters stand, high-intensity luminescence cannot be achieved at a short-wavelength of less than 365 nm determined on the basis of a bandgap of gallium nitride. The reason for this difficulty in achieving high-intensity luminescence is that, although it is necessary to make a structure of a light-emitting diode in which a material of a luminescent active layer is sandwiched by materials with a bandgap higher than that of the luminescent active layer, in order to obtain luminescence out of a deep ultraviolet region, containment of carriers is insufficient even when the luminescent active layer is sandwiched by aluminum nitride with a maximum bandgap, and its luminous efficiency is extremely decreased. For example, with respect to a light-emitting diode using an aluminum nitride crystal as a semiconductor, luminescence of an ultraviolet light at a wavelength of 210 nm, and a short wavelength, has been reported (Non-Patent Document 1). Meanwhile, its luminescent output and external quantum efficiency are low, which results in a situation where the practical use thereof is difficult.

Further, on the other hand, an ultraviolet-emitting electroluminescence element (EL element) emitting light in an ultraviolet wavelength region is known (for example, refer to Patent Document 1). Such an EL element is configured to have a double insulating layer structure in which a light-emitting film is sandwiched by two-layered dielectric insulating films, to stably emit light. In detail, the ultraviolet-emitting electroluminescence element has a structure on a transparent substrate such as glass in which a transparent conducting film formed of ITO (Indium Tin Oxide) or the like, a lower insulating film formed of $SiO_2$ or the like, a light-emitting film in which luminescence center elements are added into a host material, an upper insulating film formed in the same way as the lower insulating film, and a back surface conducting film formed of metal are laminated in series. With respect to an EL element, not only a luminous phenomenon in a visible light wavelength region, but also a luminous phenomenon in an ultraviolet wavelength region is known from long ago, and the luminescence in an ultraviolet wavelength region has been utilized as excitation energy for a phosphor, to perform a wavelength conversion of the luminescence into a visible light region (for example, refer to Patent Document 2).

As described above, a variety of attempts with respect to EL elements have been made. However, EL elements having sufficient performances for practical uses have not yet been realized, that brings about a situation where it is difficult to utilize the EL elements as key devices by applying a luminous phenomenon in an ultraviolet wavelength region to actual products.

[Patent Document 1] JP-A-2000-173775
[Patent Document 2] JP-A-Hei-11-195488
[Non-Patent Document 1] NTT Develops an Ultra-Violet LED Using Aluminum Nitride with an Extremely Short Wavelength of 210 nm (NIKKEI ELECTRONICS Jun. 19, 2006, P. 30, 31), Nature 441, 325(2006).

DISCLOSURE OF THE INVENTION

Problems to be Solved by the Invention

As described above, current mercury lamps which are utilized as ultraviolet light sources cannot be downsized, and further, light-emitting diodes with a wavelength of 365 nm or less are not at a practical level. Further, the situation is difficult for putting ultraviolet light source devices formed of EL elements into practical use.

In such situations, an object of the present invention is to provide a large-area and high-intensity deep ultraviolet light source device aimed at practical use.

Means to Solve the Objects

In order to achieve the above-described object, a deep ultraviolet light source device of the present invention includes at least an anode substrate having an ultraviolet phosphor thin film in which rare-earth metal ions are added to aluminum nitride serving as a host material, a cathode substrate having a field electron emission material thin film, a spacer for causing the anode substrate and the cathode substrate to be installed so as to face each other, and maintaining a space between the substrates in a vacuum atmosphere, and a voltage circuit for applying an electric field between the anode substrate and the cathode substrate, and in the deep ultraviolet light source device, the space between the anode substrate and the cathode substrate is made into a vacuum channel region, and electrons from the field electron emission material thin film are injected into the ultraviolet phosphor thin film to emit light by applying an electric field between the substrates.

Here, as rare-earth metal ions added to the ultraviolet phosphor thin film in the deep ultraviolet light source device, gadolinium (Gd), europium (Eu), dysprosium (Dy), lanthanum (La), cerium (Ce), samarium (Sm), yttrium (Y), neodymium (Nd), terbium (Tb), praseodymium (Pr), erbium (Er), thulium (Tm), ytterbium (Yb), scandium (Sc), promethium (Pm), holmium (Ho), lutetium (Lu), and the like are exemplified.

The above-described rare-earth metal ions are not limited particularly. However, those are preferably luminescence center ions in an ultraviolet region. Ions of rare-earth elements exhibit luminescence due to prohibited 4f transition or luminescence due to allowed 4f-5d transition. As elements as luminescence centers due to prohibited 4f transition, there are $Gd^{3+}$ (deep ultraviolet color), $Tm^{3+}$ (blue), $Tb^{3+}$ (green), $Sm^{3+}$ (red), and the like. As elements as luminescence centers due to allowed transition, there are $Ce^{3+}$, $Eu^{2+}$, and the like.

Further, Gd or a compound of Gd is preferably selected as a luminescence center of the ultraviolet phosphor thin film in the deep ultraviolet light source device mentioned above.

By use of gadolinium (Gd) as a luminescence center, it is possible to obtain a near ultraviolet light source device excellent in sterilizing/antiseptic capability. That is, a luminescence peak wavelength of $Gd^{3+}$ ion is approximately around 315 nm, which is an extremely promising element for photodecomposition of highly toxic tetrachlorodibenzodioxins, antiseptic application utilizing DNA decomposition, photocatalyst application, and the like.

Further, it is preferable that silicon (Si) is doped onto the aluminum nitride serving as a host material of the ultraviolet phosphor thin film in the deep ultraviolet light source device, to lower an electric resistance value of the ultraviolet phosphor thin film.

The lowering of resistance by adding silicon enables to suppress generation of a reverse bias due to electrostatic charge by irradiation of an excited electron beam onto the ultraviolet phosphor thin film, as a result, it is possible to improve the luminescent brightness. In detail, the lowering of resistance is preferably performed so as to make a current resistance value be approximately several Ωcm.

Further, it is preferable that the ultraviolet phosphor thin film in the deep ultraviolet light source device is a Gd-doped aluminum nitride thin film manufactured by performing sputtering of aluminum (Al) and Gd in a nitrogen atmosphere.

By use of a proven sputtering method, a low-temperature growth at a substrate temperature of 200° C. is possible, which makes it possible to form an inexpensive and high-quality ultraviolet phosphor thin film in a large area.

Here, as a field electron emission material thin film in the deep ultraviolet light source device, a field electron emission material thin film used for a general field emission display (FED) may be used. For example, an aluminum nitride thin film, or an aluminum nitride thin film to which silicon is added are used. Further, a field electron emission material thin film using a carbon nanotube (CNT) or carbon nanofiber (CNF) including CNT may be used. The field electron emission material thin film in the deep ultraviolet light source device of the present invention is not necessarily limited in its material particularly. A field electron emission material thin film which has been reported may be used.

Effects of the Invention

According to the present invention, it is possible to obtain a large-area and high-intensity deep ultraviolet light source device in a field emission system.

BRIEF DESCRIPTION OF THE DRAWINGS

FIG. 5-1 is a graph of a luminescence spectrum of the deep ultraviolet semiconductor light device (with one sheet of Gd chip).

FIG. 5-2 is a graph of a luminescence spectrum of the deep ultraviolet semiconductor light device (with three sheets of Gd chips).

BEST MODE FOR CARRYING OUT THE INVENTION

Hereinafter, one example of an embodiment of the present invention will be described in detail with reference to the drawings.

Figure 1:
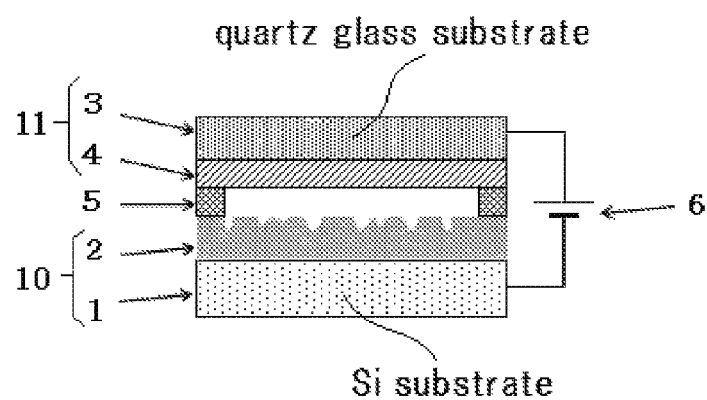
FIG. 1 is a structural schematic diagram of a deep ultraviolet semiconductor light device according to the present invention.

FIG. 1 shows a structural schematic diagram of a deep ultraviolet light source device according to the present invention. The deep ultraviolet light source device according to the present invention includes at least an Si substrate 1, an Si-doped aluminum nitride (AlN) thin film 2 made to grow at low temperature on the substrate, a quartz glass substrate 3, an ultraviolet phosphor thin film 4 in which gadolinium (Gd) is added to an aluminum nitride serving as a host material, a spacer 5, and a voltage circuit 6.

Here, the Si-doped AlN thin film 2 made to grow at low temperature on the Si substrate forms an emitter. Further, the Si substrate 1 and the Si-doped AlN thin film 2 form a cathode (negative electrode) 10, the quartz glass substrate 3 and the ultraviolet phosphor thin film 4 form an anode (positive electrode) 11, and the cathode 10 and the anode 11 face each other across the spacer 5. The space between the cathode 10 and the anode 11 is maintained in a high-vacuum atmosphere.

Note that a grid may be inserted between the cathode 10 and the anode 11 to control an emission current. In view of actual practical use, it is preferable to adopt a three-electrode system in which a grid is inserted between the cathode 10 and the anode 11.

(Method for Manufacturing Ultraviolet Phosphor Thin Film)

Figure 2:
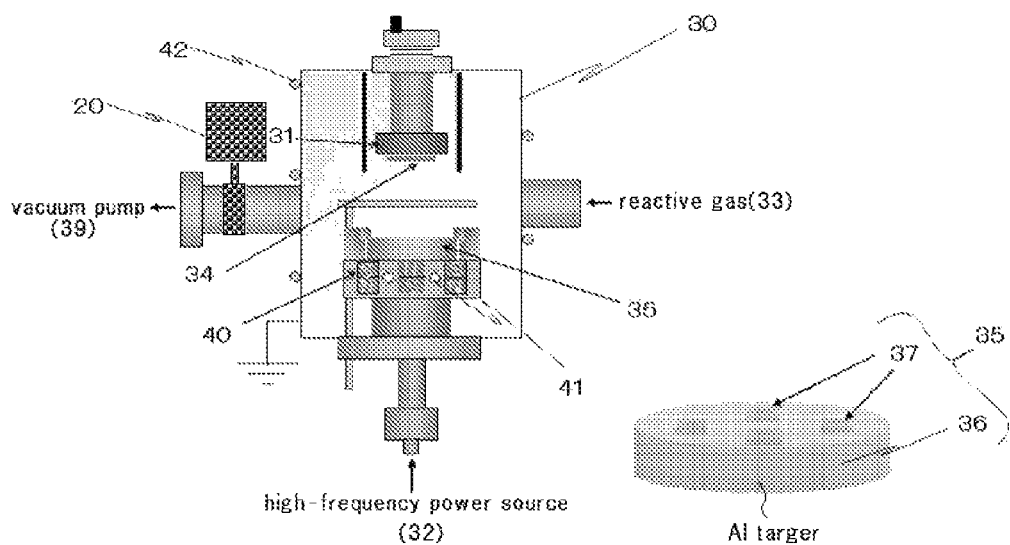
FIG. 2 is a structural schematic diagram of a reactive RF magnetron sputtering apparatus.

Next, a method for manufacturing the ultraviolet phosphor thin film 4 of the deep ultraviolet light source device according to the present invention will be described. FIG. 2 shows a structural schematic diagram of a reactive RF magnetron sputtering apparatus used for manufacturing the ultraviolet phosphor thin film 4.

Hereinafter, the method for manufacturing the ultraviolet phosphor thin film will be described with reference to the sputtering apparatus of FIG. 2.

A reactive RF magnetron sputtering apparatus 30 used for manufacturing the ultraviolet phosphor thin film is configured such that a heater 31 is provided in the upper portion of a vacuum chamber in the apparatus, a high-frequency power source 32 (not shown) is provided in the lower portion of the vacuum chamber, there is an inflow port from which a reactive gas 33 can be introduced in the right portion of the vacuum chamber, and a discharge port in the left portion of the vacuum chamber is equipped with a liquid nitrogen trap 20 to actively eliminate moisture in a residual gas inside the vacuum chamber in the sputtering apparatus, to let the reactive gas flow out by a vacuum pump 39 (not shown).

First, a quartz glass substrate 34 transparent in a deep ultraviolet region is housed as a substrate in the upper portion of the reactive RF magnetron sputtering apparatus 30, and an Al/Gd target 35 is placed on the lower portion so as to face the quartz glass substrate 34. The Al/Gd target 35 is configured such that, as shown at the lower right of FIG. 2, a predetermined number of Gd chips 37 1.5 mm square are placed on an Al target 36. The target may be an alloy target in which the composition of Al and Gd is controlled. Then, the heater 31 is controlled to keep the temperature of the quartz glass substrate 34 at 300° C., for example, and the reactive gas 33 of $N_2$ and Ar gas is made to flow into the chamber at 40 mTorr, to perform sputtering at a sputtering voltage of 1.8 kV and by RF power of 150 W.

Figure 3:
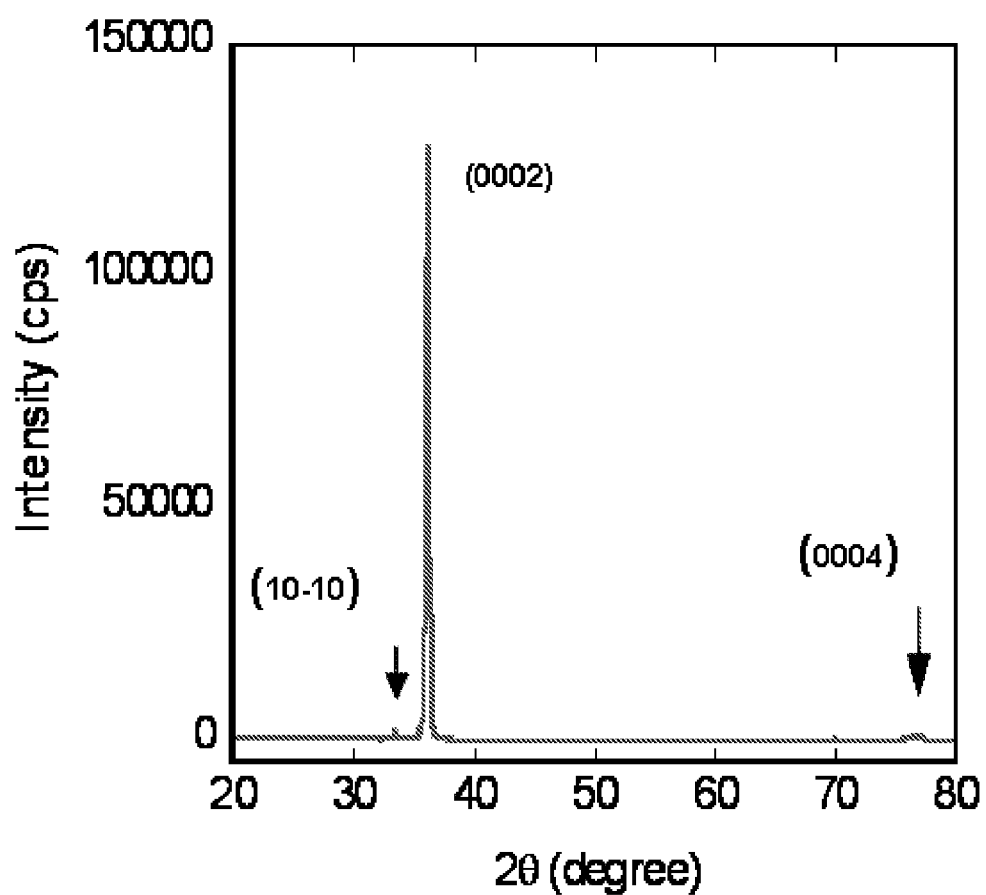
FIG. 3 is an X-ray diffraction spectrum on an AlN thin film formed on a quartz glass substrate.

By performing such sputtering, an AlN thin film in which gadolinium is added onto the quartz glass substrate 34 is formed. FIG. 3 shows an X-ray diffraction spectrum of the AlN thin film formed on the quartz glass substrate. As shown in FIG. 3, the X-ray diffraction spectrum has a (0001)-oriented crystal characteristic. As described above, the quartz glass substrate is kept at 300° C. to be subjected to sputtering, which means that the high-quality crystal film is able to be manufactured even at a low temperature of 300° C. Due to the fact that the AlN of the crystal is a transparent crystal up to approximately 200 nm, it is preferable to crystallize an AlN thin film in order to draw luminescence from the $Gd^{3+}$ ions without any loss. However, although a film manufactured on a substrate at a lower temperature including a room temperature is to exhibit an amorphous crystal characteristic, since the film has transparency at a wavelength of approximately around 315 nm as the luminescence peak of $Gd^{3+}$ ions, this film may also be used.

The Gd-doped amount is to be controlled by changing the number of the GD chips 37 on the Al target. A matching box is provided between the negative electrode which is a part of the Al/Gd target 35 and the high-frequency power source 32 (not shown), to take matching of the impedance by a matching circuit composed of a capacitor and a coil, and effectively inject high-frequency power into the apparatus. Further, a shutter is installed between the Al target 36 and the Si substrate 34, to control a film pressure onto the Gd-doped AlN thin film by opening and closing the shutter.

The apparatus is designed so as to let the reactive gas 33 out in a direction opposite to an incoming direction by the vacuum pump 39 (not shown), and the reactive gas 33 is to be supplied to the center portion of the chamber where sputtering occurs. Further, water-cooled tubes 41 are provided in the vicinity of magnets 40, to prevent the target from being heated to be melted by sputtering. Water-cooled tubes 42 are provided to the chamber main body as well, to prevent a change in plasma state due to a rise in temperature of the chamber by plasma.

(Measurement of Luminescence Spectrum of Deep Ultraviolet Light Source Device)

Figure 4:
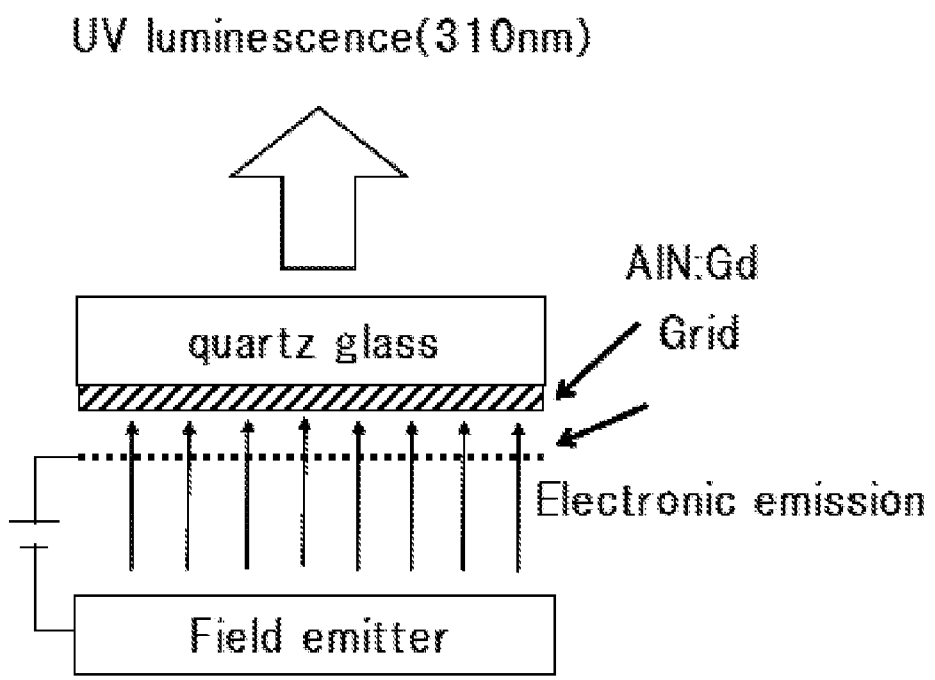
FIG. 4 is a block diagram of the deep ultraviolet semiconductor light device used for measurement.

The measurement of a luminescence spectrum of the deep ultraviolet light source device was carried out such that Si-doped aluminum nitride is used as a field emitter, and electron extraction electrodes are provided, and the grid electrode irradiates the gadolinium-added aluminum nitride (AlN:Gd) thin film formed on the quartz glass substrate with the extracted electrons. FIG. 4 shows a block diagram of the deep ultraviolet light source device used for the measurement of a luminescence spectrum.

Here, the gadolinium-added aluminum nitride (AlN:Gd) thin film is made to grow by 300 nm on the quartz glass substrate by an RF magnetron sputtering method. Further, the distance between the field emitter and the grid is set to 200 μm, and the distance between the grid and the gadolinium-added aluminum nitride (AlN:Gd) thin film is set to 500 μm. Note that the field emission current value is $5 \times 10^{-5}$ amperes.

Figures 1, 5:
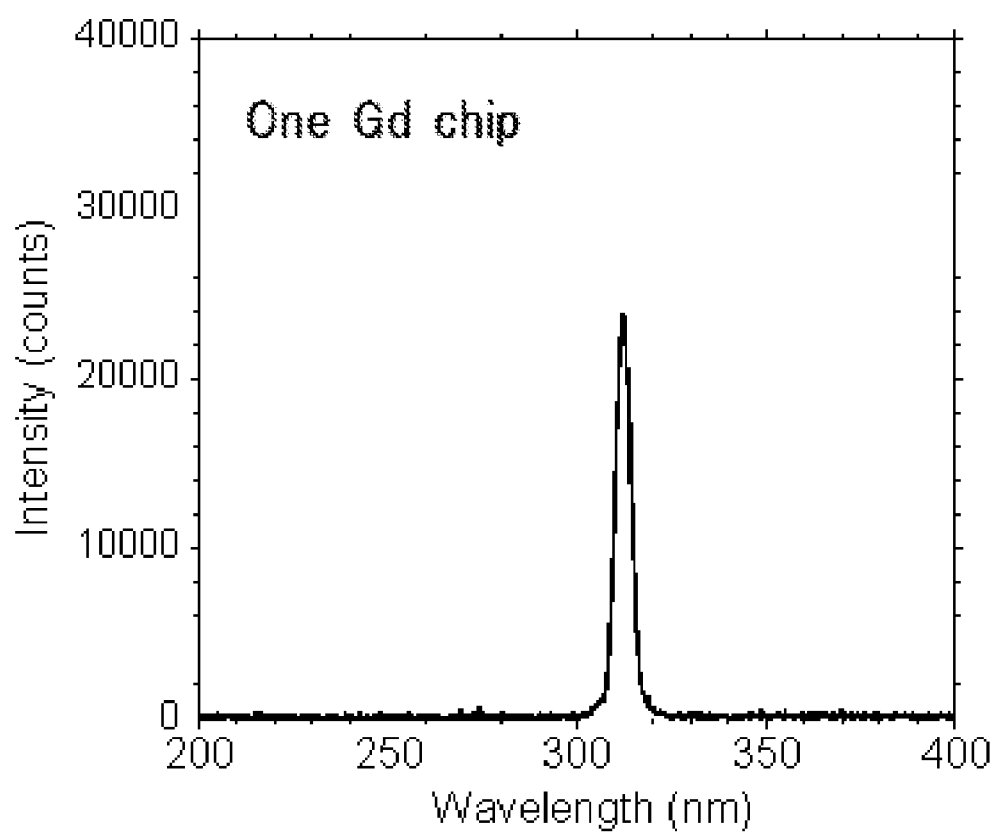
Figures 2, 5:
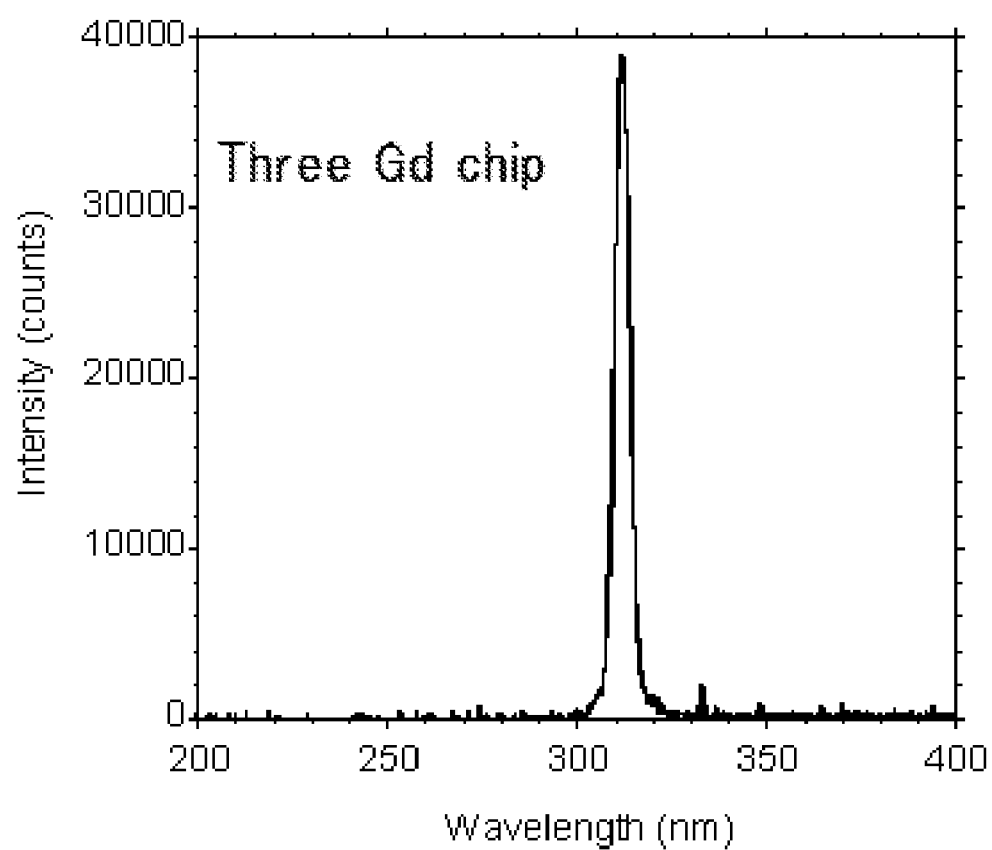

FIGS. 5-1 and 5-2 show luminescence spectrums as results of the measurement. FIG. 5-1 is a luminescence spectrum by use of the gadolinium-added aluminum nitride (AlN:Gd) thin film, which is manufactured by an RF magnetron sputtering method in a state where one sheet of gadolinium metal foil is placed on the aluminum target. Further, FIG. 5-2 is a luminescence spectrum by use of the gadolinium-added aluminum nitride (AlN:Gd) thin film, which is manufactured by an RF magnetron sputtering method in a state where three sheets of gadolinium metal foils are placed on the aluminum target. As shown in FIGS. 5-1 and 5-2, a precipitous luminescence peak due to an inner-core f-f transition of $Gd^{3+}$ in the vicinity of 310 nm can be confirmed, that shows a characteristic of excellent monochromaticity.

Further, by comparison between FIG. 5-1 and FIG. 5-2, it can be confirmed that a peak value of luminescence intensity of the gadolinium-added aluminum nitride thin film is increased by an increase in the amount of gadolinium to be added.

Figure 6:
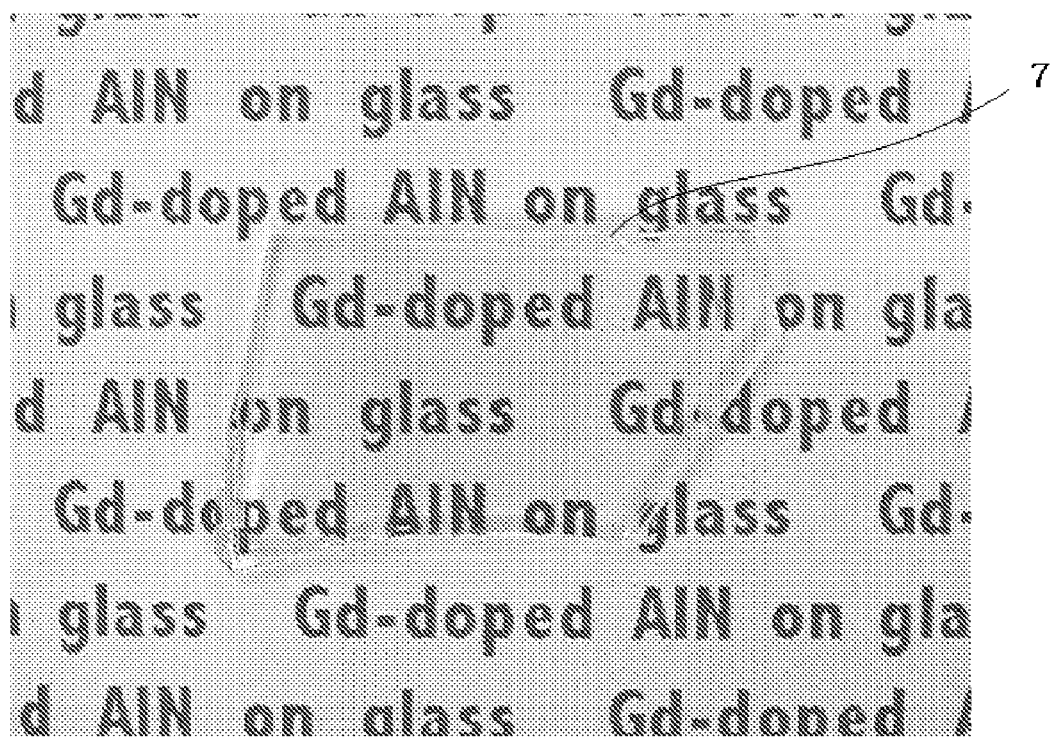
FIG. 6 is a photograph of a film of gadolinium-added aluminum nitride.

FIG. 6 shows a photograph of a film of gadolinium-added aluminum nitride, which is the ultraviolet phosphor thin film of the present invention. The film of gadolinium-added aluminum nitride is placed on purple letters drawn on paper. The film of gadolinium-added aluminum nitride is transparent, and the interference color of light can be confirmed, that shows that the film is formed flatly and uniformly on the surface of the substrate. Further, nontransparency in a visual light region due to a crystal grain boundary cannot be confirmed at all, and letters can be confirmed transparently.

INDUSTRIAL APPLICABILITY

The deep ultraviolet semiconductor light device according to the present invention is available for current industrial devices and analysis equipment facing an urgent need to be mercury-free. Further, the deep ultraviolet semiconductor light device according to the present invention can be expected to be extensively used for a wide range of application fields for antiseptic/sterilizing devices in environmental/medical fields which are currently problematic, cell sorting, surface analysis, and fluorescence analysis with pigments, decomposition/removal devices for environmental pollutants, water quality management systems, and the like.

DESCRIPTION OF SYMBOLS

1. Si substrate
2. Si-doped aluminum nitride (AlN) thin film
3. Quartz glass substrate
4. Ultraviolet phosphor thin film
5. Spacer
6. Voltage circuit
7. Quartz glass substrate in which gadolinium-added aluminum nitride thin films are laminated 10. Cathode (negative electrode)
11. Anode (positive electrode)
20. Liquid nitrogen trap
30. Reactive RF magnetron sputtering apparatus
31. Heater
32. High-frequency power source
33. Reactive gas ($N_2$ and Ar gas)
34. Quartz glass substrate
35. Al/Gd target
36. Al target
37. Gd chip
38. Matching box
39. Vacuum pump
40. Magnet
41. Water-cooled tube (in the vicinity of magnet)
42. Water-cooled tube (chamber main body)

What is claimed is:

1. A deep ultraviolet light source device comprising at least:
an anode substrate having an ultraviolet phosphor thin film of crystallization in which rare-earth metal ions are added to aluminum nitride serving as a host material;
a cathode substrate having a field electron emission material thin film;
a spacer for causing the anode substrate and the cathode substrate to be installed so as to face each other, and maintaining a space between the substrates in a vacuum atmosphere; and
a voltage circuit for applying an electric field between the anode substrate and the cathode substrate, wherein
the space between the anode substrate and the cathode substrate is made into a vacuum channel region, and
electrons from the field electron emission material thin film are injected into the ultraviolet phosphor thin film to emit light by applying an electric field between the substrates.

2. The deep ultraviolet light source device according to claim 1, wherein the rare-earth metal ions to be added to the ultraviolet phosphor thin film are ions of at least one type of metal selected from a group of Gd, Eu, Dy, La, Ce, Sm, Y, Nd, Tb, Pr, Er, Tm, Yb, Sc, Pm, Ho, and Lu.

3. The deep ultraviolet light source device according to claim 1, wherein Gd or a compound of Gd is selected as a luminescence center of the ultraviolet phosphor thin film.

4. The deep ultraviolet light source device according to claim 1, wherein Si is doped onto the aluminum nitride to lower an electric resistance value of the ultraviolet phosphor thin film.

5. The deep ultraviolet light source device according to claim 1, wherein the ultraviolet phosphor thin film is a Gd-doped aluminum nitride thin film manufactured by performing sputtering of aluminum (Al) and Gd in a nitrogen atmosphere.

* * * * *